UNITED STATES PATENT OFFICE 2,540,243

PROCESS FOR PREPARING ISOMERS OF METHYL PENTAACETYLDIHYDROSTREPTOBIOSAMINIDE

Norman G. Brink, Princeton, and Karl Folkers, Plainfield, N. J., assignors to Merck & Co., Inc., Rahway, N. J., a corporation of New Jersey No Drawing. Application October 26, 1946, Serial No. 706,041

1 Claim. (Cl. 260—210)

This invention relates to new chemical compounds useful in the study of complex organic molecules and in organic synthesis and to processes for preparing such compounds. More particularly, the invention relates to the optically-active, hydroxylic, nitrogenous, diastereomers α- and β-methyl dihydrostreptobiosaminide hydrochloride and the corresponding acetylated isomeric compounds α- and β-methyl pentaacetyldihydrostreptobiosaminide.

The new compounds of the present invention are believed to have the following structural formulae:

This application is now Patent No. 2,498,574 issued February 21, 1950.

When dihydrostreptomycin hydrochloride is reacted with dilute alcoholic hydrogen chloride, the molecule is cleared to form the diguanido tetrahydroxy cyclohexane, streptidine and a mixture of the diastereomers α- and β-dihydrobiosaminide hydrochloride. The reaction is completed at room temperature in about 15 to 20 hours as evidenced by a change in optical rotation of the reaction mixture from an initial value of $(\alpha)_D^{25} = -60°$ to a new constant value of $(\alpha)_D^{25} = -68°$.

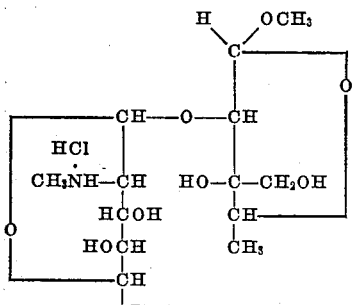

α-Methyl dihydrostreptobiosaminide hydrochloride

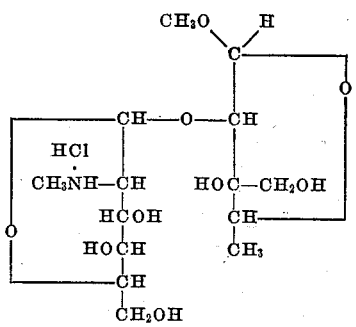

β-Methyl dihydrostreptobiosaminide hydrochloride

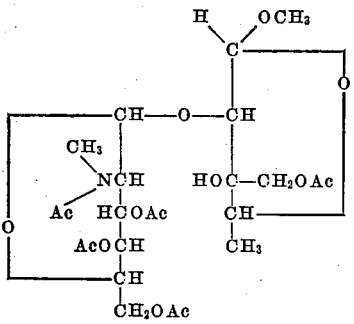

α-Methyl pentaacetyldihydro-streptobiosaminide

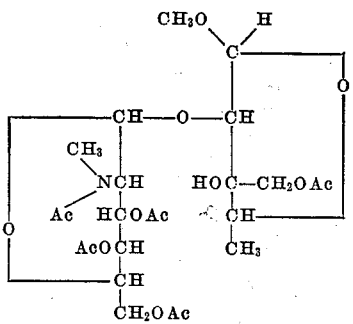

β-Methyl pentaacetyldihydro-streptobiosaminide

The new compounds of the present invention are prepared from dihydrostreptomycin hydrochloride, a compound having therapeutic activity comparable to that of streptomycin and enhanced chemical stability. The dihydrostreptomycin hydrochloride is in turn prepared by reacting streptomycin hydrochloride with hydrogen in the presence of a noble metal catalyst in accordance with the process fully disclosed in the pending application of our colleague, Robert L. Peck, Serial No. 648,007, filed February 15, 1946.

The streptidine hydrochloride can be separated from the other reaction products by selective adsorption and elution, using an adsorbent such as acid-washed alumina. The separation is carried out preferably by first concentrating the reaction mixture to dryness in vacuo under nitrogen, dissolving the amorphous residue in methanol-ether mixture (about 3:2 parts by volume), and putting this solution on a column of adsorbent prepared with a 2:1 methanol-ether mixture. The column is then washed with additional 3:2 methanol-ether mixture and the eluate, containing a mixture of α- and β-methyl dihydrostreptobiosaminide hydrochloride, is collected. By then washing the column with methanol alone, the streptidine hydrochloride is eluted.

Upon evaporating the methanol-ether eluate to dryness, the α- and β-methyl streptobiosaminide hydrochloride mixture is recovered as an amorphous tan residue, showing a rotation $(\alpha)_D^{25} = -122°$ (c, 1.49 in methanol). This residue is acetylated by treating for about 12 to 15 hours at room temperature with acetic anhydride in pyridine. Water is then added and the mixture is evaporated to dryness in vacuo. The solid residue is dissolved in chloroform, washed with water, dilute sulfuric acid, and water, and the chloroform is distilled off, leaving a white solid residue comprising a mixture of α- and β-methyl pentaacetyldihydrostreptobiosaminide.

Upon boiling this solid residue a few minutes with ether and decanting the ethereal solution from the undissolved material, a separation of an ether-soluble fraction and an ether-insoluble fraction is effected.

By recrystallizing the ether-insoluble fraction from a chloroform-ether mixture and recrystallizing from methanol, α-methyl pentaacetyldihydrostreptobiosaminide is recovered in substantially pure form. This product has a melting point of 198–198.5° C., shows an optical rotation of $(\alpha)_D^{25} = 117°$ (c, 0.865 in chloroform) and gives the following analytical data:

Calculated for $C_{24}H_{37}O_{14}N$: C, 51.15%; H, 6.62%; N, 2.49%; $CH_3CO$, 38.2%; $CH_3O$, 5.51%; mol. wt.=564. Found: C, 51.18%; H, 6.46%; N, 2.56%; $CH_3CO$, 35.8%; $CH_3O$, 4.96%; mol. wt.=571 (ebullioscopic in benzene).

By adding petroleum ether to the ether-soluble fraction, β-methyl pentaacetylstreptobiosaminide is crystallized out, and upon recrystallization from methanol, the pure product is recovered, having a melting point of 155.5–157° C., showing an optical rotation of $(\alpha)_D^{25} = -34°$ (c, 0.935 in chloroform), and giving the following analytical data, calculated values being the same as given above:

Found: C, 51.25%; H, 6.33%; N, 2.84%; $CH_3O$, 5.47%.

Acid hydrolysis of α- or β-methyl pentaacetyldihydrostreptobiosamine yields N-methyl-1-glucosamine, which can be isolated as the pentaacetyl derivative.

When the isomeric acetylated methyl glycosides are separately treated with ethyl mercaptan and hydrogen chloride, and the products subjected to hydrogenolysis using Raney nickel catalyst and then reacetylated, the same compound, pentaacetyldihydrodesoxystreptobiasoamine, is obtained from each starting material.

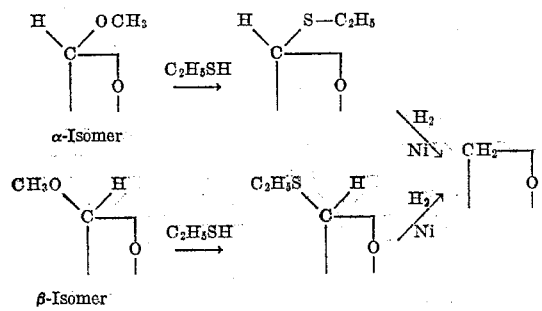

This is considered as proof that the nature of the isomerism involved in the α- and β-compounds is that indicated by the formulae given.

The following examples show how the processes of the present invention can be carried out, but it is to be understood that these examples are given by way of illustration and not of limitation.

Example I

Two grams of dihydrostreptomycin hydrochloride was dissolved in 100 ml. of methanol containing 1% of hydrogen chloride. The rotation of the solution changed from an initial value of $(\alpha)_D^{25} = -60°$ to a constant value of $(\alpha)_D^{25} = -68°$ on standing overnight (seventeen hours). The solvent was removed in vacuo under nitrogen, giving 2.12 g. of amorphous residue. This was dissolved in 154 ml. of methanol, 93 ml. of ether added, and the solution put on a column of 42.5 g. of acid-washed alumina prepared with a 2:1 methanol-ether mixture. The column was then washed with 187 ml. of a 3:2 methanol-ether mixture. The eluate was evaporated to dryness under reduced pressure, giving 425 mg. of amorphous, tan residue, $(\alpha)_D^{25} = -122°$ (c, 1.49 in methanol). This product was a mixture of methyl dihydrostreptobiosaminide hydrochlorides.

Example II

A 1.27 g. portion of the mixture of amorphous dihydro hydrochlorides, prepared as described in Example I, was acetylated overnight at room temperature with 7 ml. of acetic anhydride and 9 ml. of pyridine. Water was then added and the solution evaporated to dryness in vacuo. The product was dissolved in chloroform and the chloroform solution washed with water, dilute sulfuric acid, and with water. The chloroform was distilled, and the white solid residue boiled with 100 ml. of ether for about two minutes. The ethereal solution was decanted from the undissolved material.

The ether-insoluble fraction was crystallized from a chloroform-ether mixture, yielding 1.02 g., M. P. 195–196° C. Recrystallization from chloroform-ether, followed by two recrystallizations from methanol, gave pure α-methyl pentaacetyldihydrostreptobiosaminide, M. P. 198–198.5°, $(\alpha)_D^{25} -117°$ (c, 0.865 in chloroform).

*Analysis.*—Calculated for $C_{24}H_{37}O_{14}N$: C, 51.15; H, 6.62; N, 2.49; $CH_3CO$, 38.2; $CH_3O$, 5.51; mol. wt. 564. Found: C, 51.18; H, 6.46; N, 2.56; $CH_2CO$, 35.8; $CH_3O$, 4.96; mol. wt., 571 (ebullioscopic in benzene).

Example III

Addition of petroleum ether to the ether-soluble fraction of the acetylation product (in ether solution as obtained in Example II) gave 259 mg. of crystals, M. P. 149–153°. Recrystallization from chloroform-ether and then from methanol gave pure β-methyl pentaacetyldihydrostreptobiosaminide, M. P. 155.5–157°; $(\alpha)_D^{25} -34°$ (c, 0.935 in chloroform).

*Analysis.*—Found: C, 51.25; H, 6.33; N, 2.84; $CH_3O$, 5.47.

Modifications may be made in the foregoing procedures without departing from the spirit and scope of the present invention, and we are to be limited only by the appended claim.

We claim:

The process that comprises reacting dihydrostreptomycin hydrochloride with alcoholic hydrogen chloride, concentrating the reaction mixture to dryness, dissolving the residue thus obtained in 3:2 methanol-ether, passing the methanol-ether solution through an acid-washed alumina column, collecting the methanol-ether eluate and evaporating to dryness, thereby obtaining an amorphous mixture of α- and β-methyl dihydrostreptobiosaminide hydrochloride, reacting this mixture with acetic anhydride in pyridine and concentrating the reaction mixture to dryness to form a mixture of α- and β-methyl pentaacetyldihydrostreptobiosaminide, boiling this mixture in ether to form an ether-soluble fraction and an ether-insoluble fraction comprising α-methyl pentaacetyldihydrostreptobiosaminide, and adding petroleum ether to the ether soluble fraction to thereby precipitate β-methyl pentaacetyldihydrostreptobiosaminide.

NORMAN G. BRINK.
KARL FOLKERS.

REFERENCES CITED

The following references are of record in the file of this patent:

Karrer: "Organic Chemistry," 1938, pp. 293, 294, 297, 319, 320, 5 pages.

Carter et al.: J. Biol. Chem., v. 160 (1945), p. 340.

Peck et al.: JACS, v. 68 (1946), pp. 29–31, 3 pages.

Peck et al.: JACS, v. 68 (1946), pp. 1390–1391, 2 pages.

Brink et al.: Science, v. 102 (1945), pp. 506–507, 2 pages.